United States Patent Office 3,522,321
Patented July 28, 1970

3,522,321
DIMERIZATION OF ISOPRENE
Edwin L. DeYoung, Chicago, Ill., assignor to Universal Oil Products Company, Des Plaines, Ill., a corporation of Delaware
No Drawing. Filed Feb. 21, 1968, Ser. No. 707,319
Int. Cl. C07c 3/20
U.S. Cl. 260—666         5 Claims

ABSTRACT OF THE DISCLOSURE

Isoprene is dimerized in the presence of certain organo metallic catalysts at dimerization conditions to produce novel compositions of matter which are useful as aroma chemicals.

---

This invention relates to novel compositions of matter which are prepared by dimerizing an olefinic compound, and particularly, the invention is concerned with a process for dimerizing a diolefinic hydrocarbon to produce compounds which are useful as aroma chemicals.

Heretofore, many aroma compositions, such as perfumes, have depended, to a great extent, upon naturally occurring compounds which are blended or formulated to prepare final compositions of matter which have a pleasing and pleasant fragrance. For example, perfumes which comprise a mixture of organic compounds which include, for example, alcohols, aldehydes, ketones, esters, and hydrocarbons, are all combined in fixed proportion so that the odors of the fixed compounds will combine to produce a harmonious fragrance. Some of these compounds which are blended have been prepared from rose petals, geranium petals, or other flower petals which possess a distinctive fragrance; and thus, the product thereof, is dependent on nature as pertains to the growing season, the harvesting of the crops, as well as climatic conditions which will insure either an abundant crop or may in some instances, insure a poor or sparse crop of the desired flower. Therefore, in order to insure a continued and certain supply of various aromas, it is necessary to synthesize the compounds which possess the desired odor. By utilizing these synthetic compounds in place of the naturally occurring compounds, it is possible to prepare aroma chemicals which may be used in formulations thereafter used in the perfume and soap industry for preparing the formulations which are used to scent soaps, detergents, talcums, perfumes, colognes, etc.

In this respect, it has now been discovered that certain hydrocarbons, and particularly a diolefinic hydrocarbon such as isoprene, may be treated in the presence of certain catalysts of the type hereinafter set forth in greater detail to prepare novel compositions of matter which possess distinctive, desirable, and pleasing odors.

It is therefore an object of this invention to prepare novel compositions of matter hereinafter set forth in greater detail.

A further object of this invention is to provide a process for effecting the polymerization and particularly the dimerization of certain diolefinic hydrocarbons to prepare novel compositions of matter useful in the fragrance field.

In one aspect, an embodiment of this invention resides in a process for the dimerization of isoprene which comprises treating isoprene in the presence of a metal acetylacetonate and a trialkyl aluminum at reaction conditions, and recovering the resultant dimer.

A specific embodiment of this invention is found in the process for dimerization of isoprene which comprises treating isoprene in the presence of ferric acetylacetonate and triethyl aluminum at a temperature in the range of from about 25° to about 250° C. and at a pressure in the range of from about 1 to about 50 atmospheres, and recovering the resultant dimer.

Another specific embodiment of this invention is found in a novel composition of matter comprising 2,6-dimethyl-1,4,6-octatriene.

Other objects and embodiments will be found in the following further detailed description of the present invention.

As hereinbefore set forth, the present invention is concerned with novel compositions of matter comprising dimers of isoprene which possess a certain configuration and which also possess useful aroma properties. These dimers may be prepared by treating isoprene in the presence of certain catalytic compositions of matter at dimerization conditions. The catalytic compositions of matter which are useful to effect the dimerization of the isoprene comprise organo metallic compounds and particularly those organo metallic compounds in which the metallic portion of the catalyst comprises a metal of Group VIII of the Periodic Table such as iron, cobalt, and nickel. The organo portion of the catalyst will preferably comprise an ester. Specific examples of these organo metallic catalysts will include ferric acetylacetonate, cobalt acetylacetonate, nickel acetylacetonate. It is also contemplated that other organo metallic compounds such as ferric acetylpropionate, cobalt acetylpropionate, nickel acetylpropionate, ferric acetylbutyrate, cobalt acetylbutyrate, nickel acetylbutyrate, etc. may also be used, although not necessarily with equivalent results. In addition, a trialkyl aluminum compound is also present as a reduction agent for the organo metallic catalysts. Examples of these trialkyl compounds which may be used include trimethyl aluminum, triethyl aluminum, tri-n-propyl aluminum, triisopropyl aluminum, tributyl aluminum, etc., the preferred compounds being trimethyl aluminum or triethyl aluminum. The dimerization conditions under which the reaction is effected will include temperatures ranging from ambient (about 25° C.) up to about 250° C. or more and the pressures ranging from atmospheric up to about 50 atmospheres or more. When utilizing a reaction temperature which is in the upper portion of the range hereinbefore specified, the reaction may also be effected at superatmospheric pressures, the amount of pressure which is utilized being that which is necessary to maintain a major portion of the reactant in the liquid phase. These superatmospheric pressures may be provided for by the introduction of a substantially inert gas such as nitrogen into the reaction vessel. The reaction time during which the dimerization is effected may range from about 0.5 up to about 24 hours or more in duration, the time required to effect the dimerization being dependent upon a number of variable conditions or factors among which will include the particular reactants, the reaction temperature, the reaction pressure, etc.

The process of this invention in which novel compositions of matter comprising particular dimers of isoprene are obtained may be effected in any suitable manner and may comprise either a batch or continuous type operation. For example, when a batch type operation is used, a quantity of the isoprene is placed in a reaction vessel, the particular makeup of the vessel being dependent upon whether or not superatmospheric pressures are to be used to effect the reaction. For example, when utilizing a reaction which is to be effected at superatmospheric pressures, the isoprene is charged to an autoclave which may be of the rotating or stirred type and which contains the organo metallic catalyst of the type hereinbefore set forth in greater detail. In addition, the reactor will also contain a reducing agent such as the trialkyl aluminum, said reducing agent being present in a mole ratio in the range of 1.1 to about 2.1 moles of reducing agent to organo metallic catalyst. The vessel is sealed, nitrogen is pressed in until the desired operation pressure has been reached and the reaction flask is then heated to the desired temperature. Upon completion of the desired residence time, the autoclave and contents thereof are allowed to return to room temperature, the apparatus is vented to remove any excess pressure which may still be present and the reaction mixture is recovered. The reaction mixture is then subjected to conventional means of separation and recovery whereby the desired dimers which possess the particular configuration and which possess the desired aromas may be recovered. The conventional means of separation which may be utilized will include washing, drying, and fractional distillation under reduced pressure whereby the desired cuts are separated from any unreacted starting materials and/or side products which may have been formed during the reaction.

It is also contemplated within the scope of this invention that the process to prepare the novel compositions of matter may be effected in a continuous manner of operation. For example, one particular type of continuous operation which may be employed comprises the fixed bed type in which the catalyst is disposed as a fixed bed in a reaction zone which is maintained at the proper operating conditions of temperature and pressure. The isoprene which is to undergo dimerization is continuously charged to the reaction zone and is passed through the fixed bed of catalyst in either an upward or downward flow. Upon completion of the desired residence time, the reactor effluent is continuously withdrawn from the reactor and subjected to separation means of the type hereinbefore set forth in greater detail whereby the dimers which comprise the desired reaction product are separated and recovered from the unwanted dimers, side reaction products which may be formed, and unreacted isoprene, the latter being recycled to form a portion of the feed stock. Another type of continuous operation which may be used comprises the moving bed type of operation in which the catalyst and a reducing agent as well as the isoprene are passed through the reaction zone either concurrently or countercurrently. Yet, another type of continuous operation which may be used comprises the slurry type of operation in which the catalyst is carried into the reaction zone as a slurry in the isoprene. In the latter two types of operation, the reactor effluent is also continuously withdrawn from the reaction zone and treated in a manner similar to that described for the treatment of the reactor effluent in the fixed bed type of operation. Specific examples of dimers of isoprene which are recovered and may be used as aroma chemicals in the formulation of fragrances will include 2,6-dimethyl-1,4,6-octatriene, 2-6-dimethyl-1,3,6-octatriene, and 1,2-dimethyl-4-vinyl-1-cyclohexene, said dimers possessing a terpene-like aroma.

The following examples are given to illustrate the process of the present invention which, however, are not intended to limit the generally broad scope of the present invention in strict accordance therewith.

EXAMPLE I

In this experiment 68 grams (1.0 mole) of isoprene was placed in a bomb along with 5.0 grams (0.0142 mole) of cobalt acetylacetonate and 25 cc. (0.0284 mole) of a 15% triethyl aluminum solution in toluene. The bomb was sealed and nitrogen pressed in until an initial pressure of 50 atmospheres was reached. The bomb was then heated to a temperature of 80° C. and maintained thereat for a period of 12 hours during which time the maximum pressure rose to 60 atmospheres. At the end of the 12 hour period, the bomb and contents thereof were allowed to cool to room temperature. The excess pressure was vented and the reaction product comprising a deep red-orange solution was recovered. Following this, 2.75 grams of methyl alcohol was added to neutralize the triethyl aluminum. The solution was subjected to fractional distillation under reduced pressure at 0.1 mm. to a maximum pot temperature of 150° C. The cuts comprising 2,6-dimethyl-1,4,6-octatriene, 2,6-dimethyl-1,3,6-octatriene, and 1,2-dimethyl-4-vinyl-1-cyclohexene were recovered.

EXAMPLE II

In this example 68 grams (1.0 mole) of isoprene, 5.0 grams (0.0142 mole) of ferric acetylacetonate and 25 mm. of a 15% triethyl aluminum solution in toluene were placed in a bomb which was thereafter sealed. Nitrogen was pressed in until an initial pressure of 50 atmospheres was reached. The bomb was then heated to a temperature of 80° C. and maintained thereat for a period of 12 hours. At the end of this time the bomb and contents thereof were allowed to cool to room temperature. The excess pressure was vented and the reaction mixture comprising a dark brown solution was recovered. The solution was neutralized by adding 2.75 grams of methyl alcohol and thereafter subjected to fractional distillation under reduced pressure. The cuts comprising 2,6-dimethyl-1,4,6-octatriene, 2,6-dimethyl-1,3,6-octatriene, and 1,2-dimethyl-4-vinyl-1-cyclohexene, the identity of which was determined by a gas-liquid chromatic graphic analysis, were recovered.

EXAMPLE III

A mixture of 3.7 grams (0.014 mole) of nickel acetylacetonate, 25 cc. (0.0284 mole) of a 15% triethyl aluminum solution in toluene and 68 grams (1.0 mole) of isoprene was placed in a 450 cc. bomb which was thereafter sealed. Nitrogen was pressed in until an initial pressure of 50 atmospheres was reached and the bomb was thereafter heated to a temperature of 80° C. The bomb and contents thereof were maintained at this temperature for a period of 12 hours, and at the end of this time, heating was discontinued. The excess pressure was vented, the reaction mixture was recovered, and then neutralized by the addition of 2.75 grams of methyl alcohol. Gas-liquid chromatic graphic analysis of cuts obtained by the fractional distillation of reaction mixture under reduced pressure showed the presence of 2,6-dimethyl-1,4,6-octatriene, 2,6-dimethyl-1,3,6-octatriene, and 1,2-dimethyl-4-vinyl-1-cyclohexene.

I claim as my invention:

1. A process for the dimerization of isoprene by treating a feed consisting of isoprene, at a temperature of about 25° to about 250° C. and a pressure of about 1 to about 50 atmospheres, in contact with a catalyst consisting of (1) metal acetylacetonate in which the metal is iron, nickel or cobalt and (2) trialkyl aluminum in which the alkyl groups contain up to 4 carbon atoms each, and recovering the resultant dimer.

2. The process as set forth in claim 1, further characterized in that said metal acetylacetonate is ferric acetylacetonate.

3. The process as set forth in claim 1, further characterized in that said metal acetylacetonate is nickel acetylacetonate.

4. The process as set forth in claim 1, further characterized in that said metal acetylacetonate is cobalt acetylacetonate.

5. The process as set forth in claim 1, further characterized in that said trialkyl aluminum is triethyl aluminum.

References Cited

UNITED STATES PATENTS

| 2,753,325 | 7/1956 | Banes. | |
| 3,309,418 | 3/1967 | Hata. | |
| 3,277,099 | 10/1966 | Seibt. | |
| 3,392,209 | 7/1968 | Schneider | 260—677 |

OTHER REFERENCES

Akira Misono: Bull. Chem. Soc., Japan, vol. 39, pp. 2425–9, 1966.

Hirosi Takahasi: Chem. Abst., vol. 67, 53755q, p. 53750, 1967.

DELBERT E. GANTZ, Primary Examiner

V. O'KEEFE, Assistant Examiner

U.S. Cl. X.R.

260—680